United States Patent
Casalins Cunado

(10) Patent No.: US 12,180,126 B2
(45) Date of Patent: *Dec. 31, 2024

(54) CONCENTRATED AQUEOUS SUSPENSION OF MICROFIBRILLATED CELLULOSE COMPRISING SALTS FOR PLANT NUTRITION

(71) Applicant: TOTAL GROW, LLC, Sheridan, WY (US)

(72) Inventor: Agustin Carlos Casalins Cunado, Buenos Aires (AR)

(73) Assignee: Total Grow, Sheridan, WY (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/620,440

(22) PCT Filed: May 21, 2020

(86) PCT No.: PCT/IB2020/054847
§ 371 (c)(1),
(2) Date: Dec. 17, 2021

(87) PCT Pub. No.: WO2020/254891
PCT Pub. Date: Dec. 24, 2020

(65) Prior Publication Data
US 2022/0348515 A1    Nov. 3, 2022

Related U.S. Application Data

(63) Continuation-in-part of application No. 16/442,561, filed on Jun. 17, 2019, now Pat. No. 11,325,872.

(51) Int. Cl.
| | |
|---|---|
| *C05G 5/27* | (2020.01) |
| *C05C 5/02* | (2006.01) |
| *C05C 5/04* | (2006.01) |
| *C05D 9/02* | (2006.01) |
| *C05F 5/00* | (2006.01) |

(52) U.S. Cl.
CPC .............. *C05F 5/002* (2013.01); *C05C 5/02* (2013.01); *C05C 5/04* (2013.01); *C05D 9/02* (2013.01); *C05G 5/27* (2020.02)

(58) Field of Classification Search
CPC .. C05F 5/002; C05C 5/02; C05C 5/04; C05D 9/02; C05D 5/00; C05G 5/27; C05G 5/14; C05B 7/00; Y02A 40/20; Y02P 20/145; A01G 31/00
See application file for complete search history.

(56) References Cited

U.S. PATENT DOCUMENTS

| | | | |
|---|---|---|---|
| 1,140,618 A | 5/1915 | Sault | |
| 8,864,867 B2 | 10/2014 | Wells | |
| 9,346,717 B2 | 5/2016 | Wells | |
| 10,173,239 B2 | 1/2019 | Jurcevic | |
| 10,595,974 B2 | 3/2020 | Offermann et al. | |
| 11,325,872 B2 * | 5/2022 | Casalins Cuñado | ...... C05C 5/02 |
| 2010/0018471 A1 | 1/2010 | Murdza | |
| 2010/0186471 A1 | 7/2010 | Vriesema et al. | |
| 2010/0196471 A1 | 8/2010 | Jain et al. | |
| 2013/0108373 A1 | 5/2013 | Laukkanen et al. | |
| 2015/0158776 A1 | 6/2015 | Wells | |
| 2017/0273298 A1 | 9/2017 | Rosenberg et al. | |
| 2020/0239375 A1 | 7/2020 | Lopez et al. | |
| 2020/0392051 A1 | 12/2020 | Casalins Cuñado | |
| 2022/0194873 A1 | 6/2022 | Casalins Cunado | |

FOREIGN PATENT DOCUMENTS

| | | |
|---|---|---|
| CN | 106007850 | 10/2016 |
| CN | 106132448 | 11/2016 |
| CN | 104926430 | 4/2018 |
| CN | 108033842 | 5/2018 |
| CN | 108033845 | 5/2018 |
| CN | 108658642 | 10/2018 |
| EP | 0051230 B1 | 7/1984 |
| GB | 741493 | 12/1955 |
| GB | 0803052 | 10/1958 |
| GB | 1108164 | 4/1968 |
| GB | 1138318 | 1/1969 |
| JP | 85939789 | 3/1984 |
| RU | 2016145591 | 5/2018 |
| WO | 20110151523 | 12/2011 |

(Continued)

OTHER PUBLICATIONS

Franca, Debora, Joao Ricardo Shibata de Barros, and Roselena Faez. "Spray-dried cellulose nanofibrils microparticles as a vehicle for enhanced efficiency fertilizers." Cellulose 28 (2021): 1571-1585. (Year: 2021).*
Pub Chem "Calcium Sulfate", 2021, accessedfrompubchem.ncbi.nim.nih.gov (Year: 2021).*
Isleib, Jim. "Pros and cons of granular and liquid fertilizers." Michigan: Michigan State University Extension (2016) (Year: 2016).*
International Search Report and Written Opinion mailed Sep. 30, 2020 for corresponding International Patent Application No. PCT/IB2020/054847.

(Continued)

*Primary Examiner* — Jennifer A Smith

(74) *Attorney, Agent, or Firm* — Stradley Ronon Stevens & Young, LLP

(57) ABSTRACT

A concentrated aqueous composition of microfibrillated cellulose (MFC) comprising salts for plant nutrition. The concentrated aqueous composition comprises microfibrillated linear polymers of D-glucose molecules (cellulose microfibers), calcium ions, sulfate ions and other elements for plant nutrition. The concentration of calcium ions and sulfate ions exceeds the concentration corresponding to the solubility of calcium sulfate in water. The proportion of MFC is within a range of 1% and 99% w/w of the composition, and the precipitation of salts is prevented in a pH range from 1 to 13.

7 Claims, No Drawings

(56) References Cited

FOREIGN PATENT DOCUMENTS

| WO | 2013000074 | 3/2013 |
| WO | 20140091212 | 6/2014 |
| WO | 2014203112 | 12/2014 |
| WO | 20140203121 | 12/2014 |
| WO | 20180158677 | 9/2018 |
| WO | 20190035881 | 2/2019 |
| WO | 20200016424 | 1/2020 |
| WO | 20200254891 | 12/2020 |

OTHER PUBLICATIONS

Hjornevik:"Why Cellulose Fibrils is a Completely New Cellulose Product", 2018, accessed from exilva.com)(Year: 2018).

Mosaic: "Calcium Carbonate (Limestone)", Year 2021.

Pubchem: "Calcium Sulfate", accessed from pubchem.ncbi.nlm.nih.gov, Year: 2021.

Pinkey et al.: "Microfibrillated Cellulose—A New Structural Material", School of Chemical Engineering, University of Birmingham, Edgbaston, GB, 2 pages, 2019.

Carrasco et al., The Median Scale Hydroponic Company: The Technical of the Nutritive Solution Recirculant ("NFT"), p. 1-62, 1996 (with Machine English Translation Attached).

Gilsanz, "Hydroponics", National Agricultural Research Institute, p. 1-31, 2007 (with Machine English Translation Attached).

Jovic, "Microfibrillated cellulose: A New material with High ptotential in the packaging industry", Prescouter, Nov. 2017.

Office Action issued Jun. 21, 2022 in Chinese Application No. 202080044255.

Office Action issued Aug. 1, 2022 in Russian Application No. 2022100602.

* cited by examiner

CONCENTRATED AQUEOUS SUSPENSION OF MICROFIBRILLATED CELLULOSE COMPRISING SALTS FOR PLANT NUTRITION

RELATED APPLICATIONS

This application is a U.S. national phase filing of International Patent Application Number PCT/IB2020/054891 filed on 21 May 2020, which claims the benefit of priority of U.S. patent application Ser. No. 16/442,561 filed on 17 Jun. 2019, the contents of both of which are incorporated herein by reference in their entirety.

FIELD AND BACKGROUND OF THE INVENTION

This invention relates to nutrient compositions for plants. More specifically, it pertains to an aqueous composition of microfibrillated cellulose (MFC) that includes nutrients which are useful for plant growth.

In hydroponics and fertigation, concentrated nutrient solutions called "stock" solutions are used as fertilizers. Stock solutions are formulated by mixing inorganic salts in high concentrations and their purpose is to provide plants with all of the mineral elements that they require throughout their lifecycle.

In intensive crops that require hydroponic nutrition or fertigation, plants are supplied with all the elements by nutrient solutions prepared by dissolving fertilizing salts in water. The formulations for fertilizers in hydroponics and fertigation vary according to the specific requirements of each crop, its stage of development, and the surrounding climatic conditions.

Out of all the known natural elements, only 60 elements have been found in various plants and only 16 elements are generally considered essential for plant growth. Although most plants require only 16 essential elements, some species may need others. The essential elements are divided into two categories: macroelements and microelements.

Macroelements include carbon (C), hydrogen (H), oxygen (O), nitrogen (N), phosphorus (P), potassium (K), calcium (Ca), sulfur (S) and magnesium (Mg). Carbon, hydrogen, and oxygen are obtained from water and air, while the other elements are obtained from nutrient solutions, fertilizers, or the soil.

Microelements include iron (Fe), chlorine (Cl), manganese (Mn), boron (B), zinc (Zn), copper (Cu), molybdenum (Mo). They are absorbed in much smaller quantities by the plant as compared to macroelements.

The elements are not absorbed by plants in their elemental form, but rather as cations or anions. For example, calcium is generally supplied as a divalent cation by inorganic salts, such as calcium nitrate, which also provides nitrogen as nitrates. Nitrogen can be provided through any salt containing nitrates or through ammonium fertilizers.

Plants also require a form of sulfur for the formation of amino acids which are involved in their process of growth. Sulfur is usually provided by inorganic sulfate, which can be easily absorbed by plants. Inorganic salts such as potassium sulfate or magnesium sulfate can be used to provide sulfur.

Phosphorus is supplied through phosphates and polyphosphates: monopotassium phosphate, monoammonium phosphate, and diammonium phosphate are the most commonly used sources. The needs for potassium are fulfilled by potassium salts: potash, potassium nitrate, monopotassium phosphate, potassium chloride, and potassium sulfate are the most frequently used sources.

Elements must be present in certain forms to be able to be absorbed by plants. When an element is present in its absorbable form, it is said to be available for plant absorption. If an element is not in this available form, for example, if it is present in an insoluble precipitate, it cannot be absorbed and is of no use to the plant.

In order to provide the crops with all the needed elements, two different "stock" solutions, generally called "A" and "B", must be prepared containing high concentrations of all the necessary elements. The solutions need to be prepared separately in order to avoid precipitation of insoluble salts due to the high concentration of incompatible ions. Most importantly, calcium sulfate from calcium provided in stock A and sulfur in the form of inorganic sulfate provided in stock B will precipitate if stock A and stock B are mixed without dilution. If these elements were to precipitate, the elements would no longer be available for absorption by plants. It is important to clarify that both calcium and sulfur are essential elements for plants and must be necessarily added to nutrient solutions. Calcium is utilized for growth while sulfur is utilized to form amino acids. The latter is usually provided as inorganic sulfate since, in this form, it can be easily absorbed by the plants.

Since calcium sulfate is poorly soluble in water (at a rate of 0.67 grams/liter at 77° F. and neutral pH), nutrient solutions are formulated as stock A and B so as to add calcium and sulfate separately. It would not be commercially viable to formulate a diluted solution combining calcium and sulfate at such low levels of concentration in order to avoid the precipitation of calcium sulfate.

Another important feature of solutions stock A and stock B is that they must both have a controlled, slightly acidic pH. Each of the 13 essential mineral elements contained in these stock solutions present unique pH ranges where they are in an adequate form for absorption by plants. At pH 5 to 7, all the elements are sufficiently soluble and available for plant absorption. At lower and higher pH, the different elements are either protonated or form insoluble hydroxides which are no longer adequate species for plant absorption. The effect of pH not only affects calcium and sulfur but rather all of the elements. The pH must be controlled to ensure the availability of all the nutrients in the solution.

Of all the elements contained in stock A and stock B solutions, microelements are some of the most complicated to maintain in a soluble, available form. To aid solubility and availability for plant absorption, chelates are widely used in hydroponics, fertigation, and fertilization. Chelates are organic structures that are capable of "wrapping" ions, particularly of the microelements, thus making them stable in the solutions a nd preventing them from bonding with other ions and precipitating.

Chelates are particularly important for the provision of iron, since it is the microelement that can more easily form hydroxides and insoluble salts with other ions that are present in the nutrient solutions. It is worth mentioning that iron is essential for chlorophyll synthesis because it acts as a carrier of electrons during photosynthesis and cellular respiration, activating some enzymes as well. There cannot be a nutrient solution formulation without the incorporation of iron. To ensure solubility of iron and avoid precipitation of iron hydroxides, it is often added in its chelated form. A preferred chelating agent is ethylenediamine tetraacetic acid (EDTA).

There have been attempts to solve the problem of calcium precipitation with sulfates by chelating calcium. This is not an industrially viable option, however, because calcium is a macroelement, meaning it is needed by the plant in large quantities. If it were to be chelated, not only would the volume of fertilizer increase several fold, but also a very large amount of chelate would be incorporated into the nutrient solution or soil. Since chelates are not usually ion-specific, a large amount of calcium chelate in the solution or soil would likely have a negative effect on the availability of other metal cations. Furthermore, chelates are a relatively costly addition to nutrient solutions and a large requirement for chelates would be financially inviable.

In addition, calcium chelate only remains stable in a pH that ranges from 6 to 14, while on the other hand iron chelate remains stable only under acidic conditions. Therefore, the pH range that would enable the incorporation of all the nutrients by using both chelates is very limited (6 to 7). This complicates the obtainment process of the solution and limits the concentration of salts that would imply higher levels of acidity.

It would be desirable to have a single concentrated product including all of the necessary ingredients for plant growth: where the availability of elements such as calcium, iron, and sulfur could be guaranteed and where the pH need not be tightly controlled in order to ensure plant nutrient availability. Such a concentrated product could be used for hydroponics, fertigation, and direct substrate fertilization.

Surprisingly, the inventors have found that MFC guarantees the availability of all essential elements, by preventing the precipitation of salts, in a pH range from 1 to 13.

SUMMARY OF THE INVENTION

The main object of the invention is a nutrient solution that combines all the essential elements contained in stock A (which provides calcium) and stock B (which provides sulfates) in a single stabilized composition, in a microfibrillated cellulose medium, having a concentration of calcium and sulfate in excess of that corresponding to the normal solubility of calcium sulfate in water.

More specifically, the object of the invention is a concentrated aqueous composition of microfibrillated cellulose comprising salts for plant nutrition wherein the concentrated aqueous composition comprises microfibrillated linear polymers of D-glucose molecules (cellulose microfibers), calcium ions, sulfate ions and other elements for plant nutrition such as nitrogen, phosphorus, potassium, magnesium, iron, chlorine, manganese, boron, zinc, copper, molybdenum, and others. The concentration of calcium ions and sulfate ions exceeds the concentration corresponding to the solubility of calcium sulfate in water and the proportion of microfibrillated cellulose (MFC) is within a range of 1% and 99% w/w of the composition.

Another object of the invention is the use of microfibrillated cellulose for the preparation of a concentrated composition comprising the mixing of microfibrillated linear polymers of D-glucose molecules (cellulose microfibers), calcium ions, sulfate ions and other elements for plant nutrition such as nitrogen, phosphorus, potassium, magnesium, iron, chlorine, manganese, boron, zinc, copper, molybdenum, and others. The concentration of calcium ions and sulfate ions exceeds the concentration corresponding to the solubility of calcium sulfate in water and the proportion of microfibrillated cellulose (MFC) is within a range of 1% and 99% w/w of the composition.

Another object of the invention is a method for the preparation of a concentrated aqueous composition of microfibrillated cellulose comprising salts for plant nutrition wherein the method comprises the step of mixing microfibrillated linear polymers of D-glucose molecules (cellulose microfibers), calcium ions, sulfate ions and other elements for plant nutrition such as nitrogen, phosphorus, potassium, magnesium, iron, chlorine, manganese, boron, zinc, copper, molybdenum, and others. The concentration of calcium ions and sulfate ions exceeds the concentration corresponding to the solubility of calcium sulfate in water and the proportion of microfibrillated cellulose (MFC) is within a range of 1% and 99% w/w of the composition.

Another object of the invention is a method for plant nutrition using hydroponics, fertigation, or direct substrate fertilization techniques comprising the step of supplying a concentrated aqueous composition of microfibrillated cellulose comprising salts for plant nutrition wherein the concentrated aqueous suspension comprises microfibrillated linear polymers of D-glucose molecules (cellulose microfibers), calcium ions, sulfate ions and other substances for plant nutrition such as nitrogen, phosphorus, potassium, magnesium, iron, chlorine, manganese, boron, zinc, copper, molybdenum, and others. The concentration of calcium ions and sulfate ions exceeds the concentration corresponding to the solubility of calcium sulfate in water and the proportion of microfibrillated cellulose (MFC) is within a range of 1% and 99% w/w of the composition.

Another object of the invention is the use of a concentrated aqueous composition of microfibrillated cellulose comprising salts for plant nutrition wherein the concentrated aqueous composition comprises microfibrillated linear polymers of D-glucose molecules (cellulose microfibers), calcium ions, sulfate ions and other elements for plant nutrition such as nitrogen, phosphorus, potassium, magnesium, iron, chlorine, manganese, boron, zinc, copper, molybdenum, and others. The concentration of calcium ions and sulfate ions exceeds the concentration corresponding to the solubility of calcium sulfate in water and the proportion of microfibrillated cellulose (MFC) is within a range of 1% and 99% w/w of the composition, for the attainment of a solid fertilizer.

DESCRIPTION OF SPECIFIC EMBODIMENTS OF THE INVENTION

The formulations for fertilizers vary according to the specific requirements of each crop, its stage of development, and the surrounding climatic conditions.

The salts that are most commonly used for the formulation of stock A are as follows:
Calcium nitrate
Potassium nitrate (optional, since it is also present in stock B)
Ammonium nitrate
Potash
Potassium chloride
Calcium oxide
Calcium chloride
Iron ethylenediamine tetraacetic acid (Fe EDTA)
Sodium molybdate (dihydrate)
Ammonium molybdate
Ethylenediamine tetraacetic manganese (Mn EDTA)
Manganese chloride
Ethylenediamine tetraacetic zinc (Zn EDTA)
Zinc chloride
Ethylenediamine tetraacetic magnesium (Mg EDTA)
Magnesium oxide
Ethylenediamine tetraacetic copper (Cu EDTA)
Ethylenediamine tetraacetic cobalt (Co EDTA)
Boric acid Sodium tetraborate The most common salts to formulate stock B are:
Potassium sulfate
Magnesium sulfate
Ammonium sulfate
Ferrous sulfate
Copper sulfate
Magnesium sulfate
Zinc sulfate
Phosphate
Monopotassium phosphate
Diammonium phosphate
Phosphoric anhydride
Potassium nitrate As described above, stock A usually includes the nitrates (calcium, potassium, and ammonium) and the EDTA-chelated microelements. However, another possible common formulation is to incorporate only the nitrates (calcium, potassium, and ammonium) and the iron EDTA in stock A; and to incorporate the microelements in the form of sulfates (magnesium, manganese, copper, zinc, etc.) in stock B, so that sulfates and calcium do not precipitate as calcium sulfate.

Surprisingly, the inventors found another alternative which involves the use of microfibrillated cellulose (MFC), obtained from a fibrillation process of cellulose in a wet state.

Microfibrillated cellulose (MFC) is a substance composed of cellulose and water, with a cellulose concentration of less than 15%. It is characterized by being able to store large quantities of water in relation to its mass, obtaining "creamy" or "gel-type" suspensions with very low proportions of microfibrillated cellulose (as low as 2%). Its pH varies in a range from 4 to 8 and its density between 1.2 and 1.6 kg/L.

Cellulose microfibrils are very small cellulose fibers obtained from the mechanical disintegration of plant fibers and by a sequence of specific chemical and mechanical treatments (fibrillation process).

When the cellulose goes through a fibrillation process, the surface area becomes much larger in comparison with the original raw material, thus generating a significant increase in the quantity of hydroxyl groups (OH) available on the surface of the microfibrils. As these hydroxyl groups have a natural negative charge, they will be able to capture ions with a positive charge, such as calcium ions. In this way, the calcium ions are prevented from bonding with the sulfates, avoiding altogether its precipitation as calcium sulfate. Microfibrillated cellulose retains its structure in a pH range from 1 to 13, meaning the number of available hydroxyl groups are not significantly modified by pH. The interaction between hydroxyl groups and ions is therefore highly resistant to external pH modification.

In the case of compositions with a low proportion of humidity, it is possible to obtain a solid fertilizer with highly beneficial characteristics. One of them is to allow the release of the nutrients on demand of the plant. The solid fertilizer contributes nutrients to the water retained by the substrate by a diffusion process and, as the plant absorbs them, the solid fertilizer contributes new nutrients; in this way the solid fertilizer effectively releases nutrients on demand of the plant. On the other hand, the hydroxyl groups of the MFC compete with the surrounding water for interaction with the nutrient ions, so the degree of leaching of nutrients is reduced, since they are withheld by the MFC in the presence of rain.

A preferred aqueous composition of the present invention includes (all percentages in the following description and in the examples correspond to % w/w):
between 60% and 90% of water
between 1% and 40% of microfibrillated cellulose (MFC)
between 1% and 55% of calcium nitrate
between 0.01% and 0.5% of magnesium EDTA
between 0.01% and 0.7% of manganese EDTA
between 0.01% and 0.7% of zinc EDTA
between 0.01% and 0.9% of iron EDTA
between 0.010% and 0.1% of copper EDTA
between 0.001% and 0.01% sodium molybdate (dihydrate)
between 0.0001% and 0.001% of cobalt EDTA
between 0.01% and 0.4% of boric acid
between 1% and 12% of potassium nitrate
between 0.5% and 25% of monopotassium phosphate
between 0.5% and 42% of magnesium sulfate
between 0.1% and 11% of potassium sulfate A most preferred aqueous composition of the present invention includes.
18.6 liters of water (68.2%)
6,000 grams of microfibrillated cellulose (22.0%)
1,000 grams of calcium nitrate (3.7%)
12 grams of magnesium EDTA (0.0440%)
20 grams of manganese EDTA (0.0733%)
20 grams of zinc EDTA (0.0733%)
25 grams of iron EDTA (0.0916%)
3 grams of copper EDTA (0.0110%)
0.3 grams of sodium molybdate (dihydrate) (0.0011%)
0.03 grams of cobalt EDTA (0.0001%)
10 grams of boric acid (0.0366%)
300 grams of potassium nitrate (1.10%)
400 grams of monopotassium phosphate (1.47%)
750 grams of magnesium sulfate (2.75%)
150 grams of potassium sulfate (0.55%)

The following examples show the preparation of concentrated formulations that may contain all the necessary components for a plant. The formulations are not intended to specify the required quantities or to restrict the ingredients used. Their main intention is to show the preparation of a concentrated aqueous suspension of this invention. The following examples also demonstrate the effectiveness of concentrated formulations in different crops. The examples are not intended to limit or restrict the crops for which the formulations can be used. Concentrated suspensions or solid fertilizers can be formulated for every and any crop.

EXAMPLES

Example 1

Preparation of Concentrated Aqueous Suspension
Example to Prepare 10 Liters of Stock A:
The following elements were mixed into 9.3 liters of water at 77° F. and neutral pH (the reason that 9.3 liters of water are added is to get 10 liters of stock A, as salts provide approximately 700 cc of the volume):
1,000 grams of calcium nitrate
12 grams of magnesium EDTA
20 grams of manganese EDTA
20 grams of zinc EDTA
25 grams of iron EDTA
3 grams of copper EDTA
0.3 grams of sodium molybdate (dihydrate)
0.03 grams of cobalt EDTA
10 grams of boric acid The weight of the resulting 10 liters of stock A is 10,390 grams.

Example to prepare 10 liters of stock B:

The following elements were mixed into 9.3 liters of water at 77° F. and neutral pH (the reason that 9.3 liters of water are added is to get 10 liters of stock B since salts provide approximately 700 cc of the volume):

300 grams of potassium nitrate
400 grams of monopotassium phosphate
750 grams of magnesium sulfate
150 grams of potassium sulfate The weight of the resulting 10 liters of stock B is 10,900 grams.

Example to obtain 27.3 kilos of concentrated aqueous suspension of stock A and B in microfibrillated cellulose:

The reason that 27.3 kilos are prepared is because the proportions, in this formulation, are 6 parts of microfibrillated cellulose (MFC) for every 10 parts of Stock A (10,390 grams) and 10 parts of Stock B (10,900 grams), which results in the aforementioned quantity.

Six kilos of microfibrillated cellulose (MFC) were mixed into 10 liters of stock A and stirred manually for 5 minutes. Then, 10 liters of stock B were added to the resulting solution and stirred manually for 5 minutes. The resulting solution has the initial composition of stock A and stock B as well as the microfibrillated cellulose (MFC), with a pH of 3.4. This means:

18.6 liters of water (68.2%)
6,000 grams of microfibrillated cellulose (22.0%)
1,000 grams of calcium nitrate (3.7%)
12 grams of magnesium EDTA (0.0440%)
20 grams of manganese EDTA (0.0733%)
20 grams of zinc EDTA (0.0733%)
25 grams of iron EDTA (0.0916%)
3 grams of copper EDTA (0.0110%)
0.3 grams of sodium molybdate (dihydrate) (0.0011%)
0.03 grams of cobalt EDTA (0.0001%)
10 grams of boric acid (0.0366%)
300 grams of potassium nitrate (1.10%)
400 grams of monopotassium phosphate (1.47%)
750 grams of magnesium sulfate (2.75%)
150 grams of potassium sulfate (0.55%)

The weight of the suspension is 27,290 grams.

Examples of mixes with and without precipitates

Example 2

Stock A and Stock B were Mixed

One hundred (100) cc of the obtained stock A and 100 cc of the obtained stock B were mixed at 77° F.; the mixture was stirred and after 3 minutes the emergence of a precipitate was observed. Thirty minutes later the mixture was stirred again and 2 minutes after that the precipitate was still present, thus confirming that the precipitate does not re-dissolve.

Example 3

Stock a and MFC were Mixed, then Stock B was Added

One hundred (100) cc of the obtained stock A were mixed into 60 grams of microfibrillated cellulose (MFC); the mixture was stirred manually, and then 100 cc of the obtained stock B were immediately added. After 3 minutes, no precipitate emergence was observed. The sample was monitored 24 hours later, 48 hours later, and even 90 days later but no modifications were found in its appearance.

Example 4

Stock B and MFC were Mixed, and then Stock a was Added.

In this example, the order of the stocks in the preparation of the aqueous suspension was exchanged. One hundred (100) cc of the obtained stock B were mixed into 60 grams of microfibrillated cellulose (MFC); the mixture was manually stirred and then 100 cc of the obtained stock A were added. After 3 minutes no precipitate was seen emerging. The sample was monitored 24 hours later, 48 hours later, and even 90 days later but no modifications were found in its appearance.

Examples 3 and 4 demonstrate the flexibility of the addition of MFC to the formulations. It is evident to a person skilled in the art, however, that the present formulations may be prepared without the need for initial stock solutions through direct mixing of the essential salts with MFC.

Example 5

This example aims to demonstrate that there is no evidence of toxicity in the use of microfibrillated cellulose (MFC) when it is used in a nutrient solution. Three identical small hydroponic floating systems were prepared in which two lettuce specimens were grown.

The hydroponic floating system consisted of 20-liter trays where two seedlings of lettuce were laid in each one. The trays had a flat bar of polystyrene to support the seedlings and each of them had two holes that enabled the roots to reach the water contained in the trays.

Hydroponic system number 1 was fed with stock A and stock B nutrient solutions, and no microfibrillated cellulose (MFC) was added. Hydroponic system number 2 was fed with a concentrated aqueous suspension of stock A and B in microfibrillated cellulose (MFC) having a microfibrillated cellulose (MFC) concentration of 23%. Hydroponic system number 3 was fed with a concentrated aqueous suspension of stock A and B in microfibrillated cellulose (MFC), having a microfibrillated cellulose (MFC) concentration of 80%.

The amount of solution and/or aqueous suspension added in the three systems had the same electrical conductivity in each case, ensuring the same provision of salts in each of them (electrical conductivity is a measure of the amount of dissolved solids per unit of volume).

The targeted electrical conductivity varied from week to week, depending on the requirements of the lettuce plants in their lifecycle, having 350 ppm in week 1, 700 ppm in week 2, 1,050 ppm in week 3, and 1,400 ppm in week 4.

After week 4 all the lettuce plants had showed equal growth and reached a weight ranging between 270 and 280 grams each.

Thus, we can conclude that microfibrillated cellulose (MFC) allows for the availability of salts for plants as well as the right absorption of nutrients since the growth of specimens studied did not reveal significant variations.

Example 6

This example shows how microfibrillated cellulose (MFC) prevents calcium sulfate from precipitating even when solutions of calcium nitrate and sulfates in their highest possible concentration at 77° F. and neutral pH are mixed.

Two Samples were Tested:

A control sample where three salt dilutions at its highest possible concentration at 77° F. and neutral pH were mixed, in this order: 180 cc of water*, 100 cc of calcium nitrate solution (1,200 grams in 1 liter of water), 100 cc of potassium sulfate solution (120 grams in 1 liter of water), and 100 cc of manganese sulfate solution (710 grams in 1 liter of water).

*One hundred and eighty (180) cc of water was added so as to equate the volumes in the samples (water in the first one and microfibrillated cellulose in the second one).

After mixing them mechanically, observed was a precipitate of 192 grams of calcium sulfate.

In the other sample, three salt dilutions at its highest possible concentration at 77° F. and neutral pH, were mixed in microfibrillated cellulose (MFC), following this order: 100 cc of calcium nitrate solution (1,200 grams in 1 liter of water) in 60 grams of microfibrillated cellulose (MFC), 100 cc of potassium sulfate solution (120 grams in 1 liter) in 60 grams of microfibrillated cellulose (MFC), and finally 100 cc of manganese sulfate solution (710 grams in a liter) in 60 grams of microfibrillated cellulose (MFC). The three suspensions were mixed altogether. There were no signs of a precipitate after 48 hours.

Example 7

This example shows that microfibrillated cellulose (MFC) makes it possible to elaborate suspensions of homogeneously distributed salts that contain solids in a much higher proportion than the quantity of salts that could be contained in a water solution of the same volume.

Two sample tests were run.

A control sample was run where potassium sulfate was added in an amount that exceeded twice its solubility in water at 77° F. and neutral pH (111 g/L). More specifically, mixed were 28.8 grams of potassium sulfate in 130 cc of water at 77° F. It was stirred manually and immediately after that a precipitate of potassium sulfate was noted.

Sample number 2 consisted of the same amount of potassium sulfate contained in the control sample (that is, 28.8 grams) that was added into a suspension of the same volume (130 cc) with microfibrillated cellulose (MFC) at 23% (30 grams of microfibrillated cellulose in 100 cc of water). It was stirred manually and after 5 minutes no decantation of potassium sulfate was observed. The sample was monitored 24 hours later, 48 hours later, and even 90 days after without having observable modifications in its appearance.

Example 8

Preparation of a Solid-Consistency Fertilizer

An aqueous suspension prepared as described in example 1 is the starting point.

Taken were 1,000 grams of the concentrated aqueous suspension of stock A and B in microfibrillated cellulose (MFC) as described in example 1. This suspension was poured into granular-shaped molds of 10 cm³, each of them containing 12 grams of suspension, and were placed in a dehydrator oven at 161.6° F. for 24 hours. The final result of this process was a product with solid consistency. In each cast, a 3 gram tablet was obtained, which implies a loss of 8 grams of water. Assuming that the microfibrillated cellulose (MFC) lost 50% of its humidity and knowing that its fiber ratio is 15%, the resulting composition of each tablet is.

10.00% water
50.56% microfibrillated cellulose
14.65% calcium nitrate
0.176% magnesium EDTA
0.293% manganese EDTA
0.293% zinc EDTA
0.366% iron EDTA
0.044% copper EDTA
0.044% sodium molybdate (dihydrate)
0.0044% cobalt EDTA
0.147% boric acid
4.39% potassium nitrate
5.86% monopotassium phosphate
10.99% magnesium sulfate
2.19% potassium sulfate Example 9

Nutrition of a tomato specimen using the concentrated aqueous suspension in its solid form.

A tomato specimen was grown using for its nutrition only the concentrated aqueous suspension in its solid from, obtained as described in example 8.

A thin layer of leca was first placed in an 11 liter pot to facilitate the drainage, and then filled with an inert, nutrient-free substrate (peat). Then, 12 tablets obtained as described in example 8 were placed evenly distributed throughout the pot. The pot was watered according to its demand, water being the only input added during the whole cycle. In a 105-day cycle, the plant produced 43 tomatoes with a total weight of 4.9 kilos. The plant showed a normal size with a suitable growth speed and the presence of healthy leaves, particularly in the upper part of its stem.

This experiment suggests that the nutrients were effectively released at the plant's request throughout the cycle.

According to the examples provided in the present description, it is possible to conclude that the present invention has the following advantages over the prior art:

The aqueous suspension with MFC allows for the combination of salts whose concentration would naturally lead to precipitates.

The elaboration of complete formulations that are totally balanced for each type of crop in only one suspension is possible, which results in higher yields as the crop suffers from no nutritional deficiencies in all its lifecycle as shown in example 9. In its solid version, the nutrients are released on plant demand and there is a reduction in leaching.

Simplification of the use of fertilizers, since there is no longer a need to handle several solutions such as stock A and stock B.

Lower transportation costs and carbon footprint reduction due to the possibility to transport a greater amount of salts in the same volume.

Reduction in packaging as a result of the fewer wrappings needed to deliver the complete formulations.

Product shelf-life: the product shelf-life increases due to the stability of the suspension.

Lower storage costs and convenient stock management.

No pH controls to ensure plant nutrient availability.

The same suspension can be used in all agricultural applications: hydroponics, fertigation, and direct substrate fertilization.

What is claimed is:

1. A solid fertilizer obtained by a process including the step of dehydrating a concentrated aqueous composition for plant nutrition to obtain a product with a solid consistency wherein the concentrated aqueous composition comprises (all percentages correspond to % w/w):
between 60% and 90% of water;
between 1% and 40% of MFC,
between 1% and 55% of calcium nitrate;

between 0.01% and 0.5% of magnesium EDTA (ethylenediamine tetraacetic acid);
between 0.01% and 0.7% of manganese EDTA;
between 0.01% and 0.7% of zinc EDTA;
between 0.01% and 0.9% of copper EDTA;
between 0.001% and 0.01% sodium molybdate (dihydrate);
between 0.0001% and 0.001% of cobalt EDTA;
between 1% and 12% of potassium nitrate;
between 0.5% and 25% of monopotassium phosphate;
between 0.5% and 42% of magnesium sulfate; and
between 0.1% and 42% of potassium sulfate.

2. The solid fertilizer according to claim 1 wherein the solid fertilizer is in the form of a tablet including:
10.00% water;
50.56% MFC;
14.65% calcium nitrate;
0.176% magnesium EDTA;
0.293% manganese EDTA;
0.293% zinc EDTA;
0.366% iron EDTA;
0.044% copper EDTA;
0.044% sodium molybdate (dihydrate);
0.0044% cobalt EDTA;
0.147% boric acid;
4.39% potassium nitrate;
5.86% monopotassium phosphate;
10.99% magnesium sulfate; and
2.19% potassium sulfate.

3. The solid fertilizer according to claim 1, wherein a concentrated aqueous composition further comprises:
18.600 liters of water;
6,000 grams of MFC;
1,000 grams of calcium nitrate;
12 grams of magnesium EDTA;
20 grams of manganese EDTA;
20 grams of zinc EDTA;
25 grams of iron EDTA;
3 grams of copper EDTA;
0.3 grams of sodium molybdate (dihydrate);
0.03 grams of cobalt EDTA;
10 grams of boric acid;
300 grams of potassium nitrate;
400 grams of monopotassium phosphate;
750 grams of magnesium sulfate; and
150 grams of potassium sulfate.

4. The solid fertilizer according to claim 1, wherein the dehydrating step is carried out for 24 hours at 161.6° F.

5. The solid fertilizer according to claim 1, wherein the process further includes the steps of pouring the aqueous concentrated composition in a mold and dehydrating it to obtain a shaped product with a solid consistency.

6. The solid fertilizer according to claim 5, wherein the dehydrating step is carried out for 24 hours at 161.6° F.

7. The solid fertilizer according to claim 5, wherein the shaped product is a tablet.

* * * * *